Figure 1:
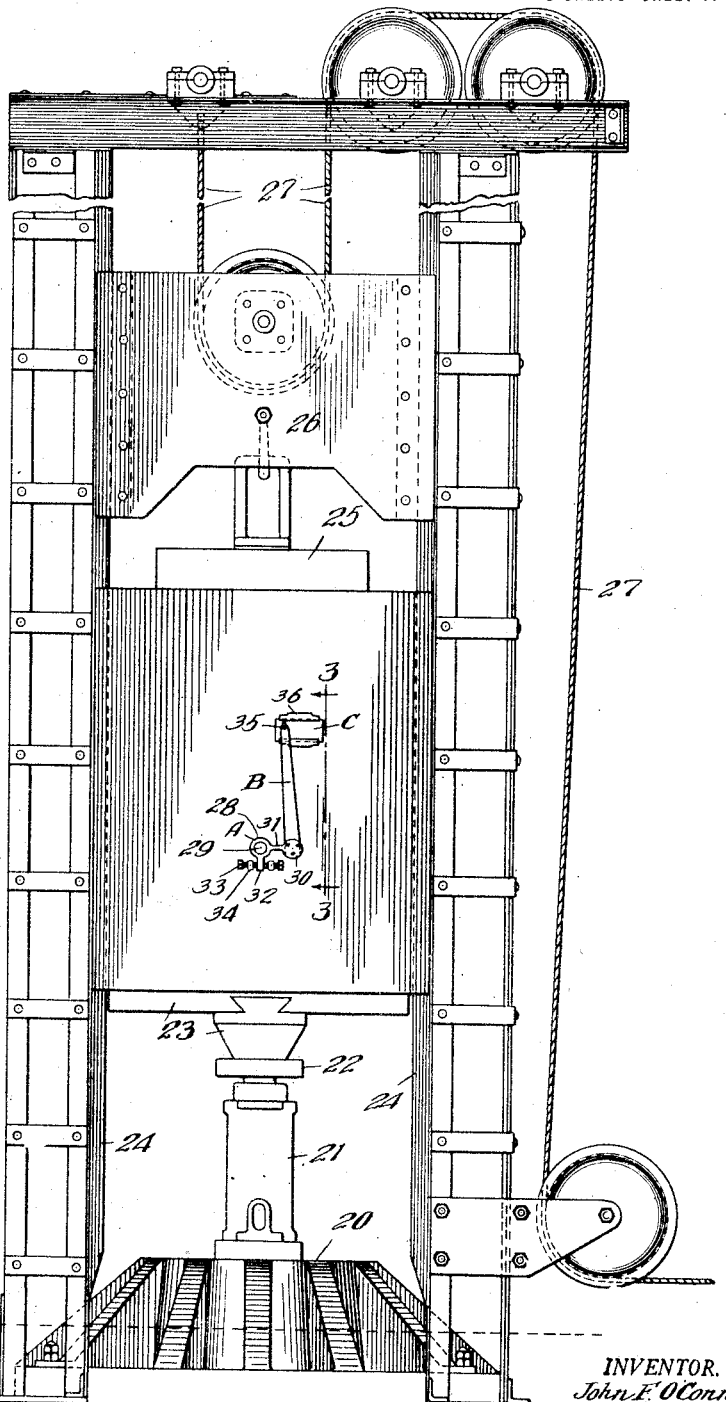

J. F. O'CONNOR.
RECORDING MECHANISM.
APPLICATION FILED JULY 19, 1916.

1,255,919.

Patented Feb. 12, 1918.
3 SHEETS—SHEET 1.

WITNESSES:
Wm. Geiger
Elizabeth M. Britt

INVENTOR.
John F. O'Connor
BY George I. Haight
his ATTORNEY

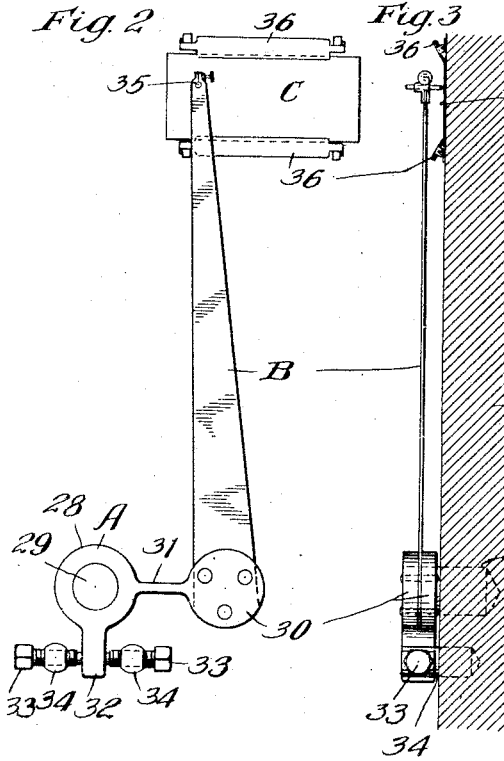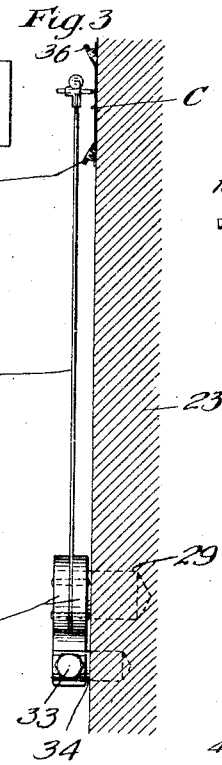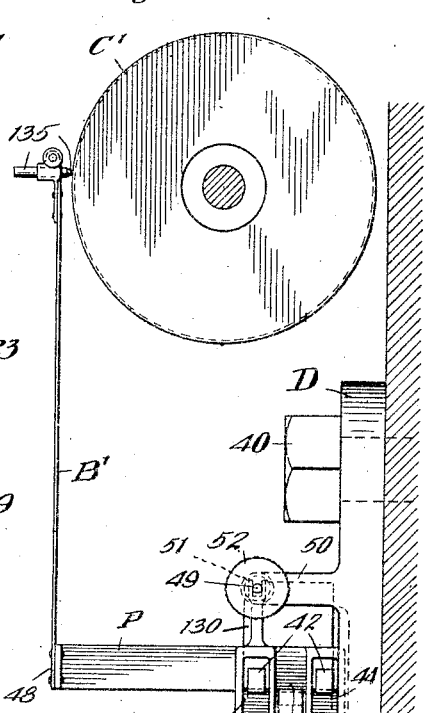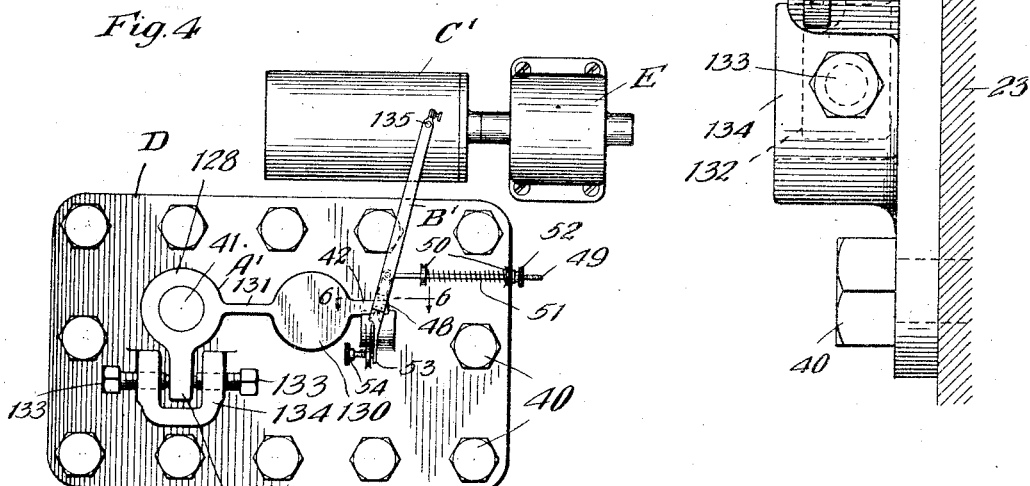

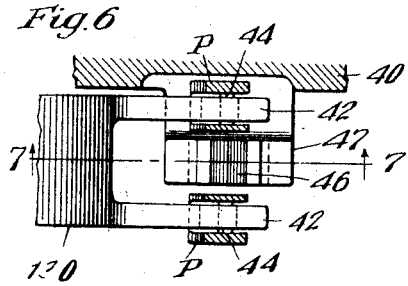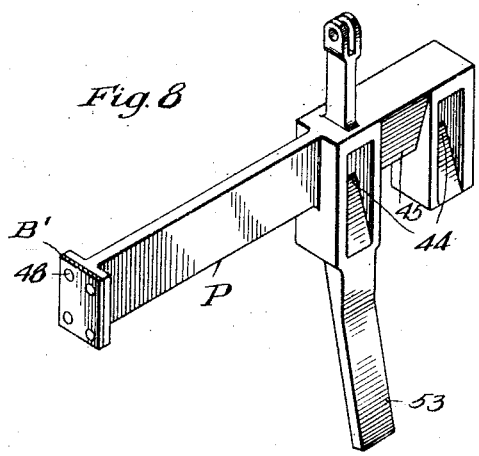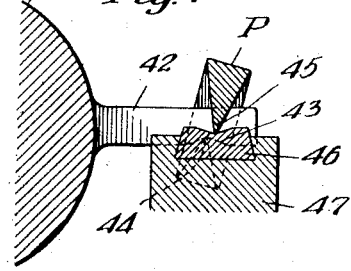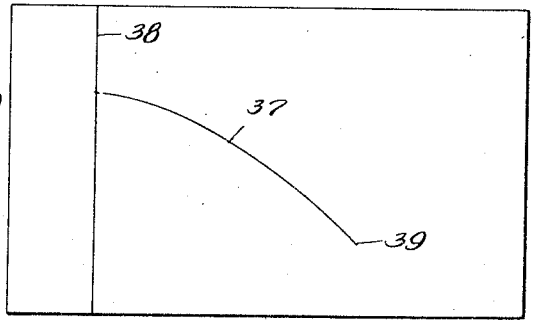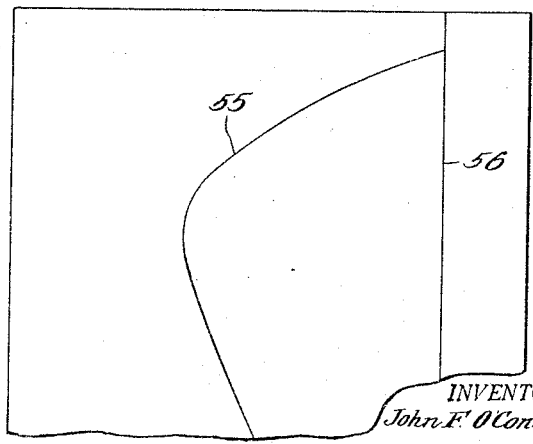

UNITED STATES PATENT OFFICE.

JOHN F. O'CONNOR, OF CHICAGO, ILLINOIS, ASSIGNOR TO WILLIAM H. MINER, OF CHAZY, NEW YORK.

RECORDING MECHANISM.

1,255,919.  Specification of Letters Patent.  Patented Feb. 12, 1918.

Application filed July 19, 1916. Serial No. 110,017.

*To all whom it may concern:*

Be it known that I, JOHN F. O'CONNOR, a citizen of the United States, residing at Chicago, in the county of Cook and State of Illinois, have invented a certain new and useful Improvement in Recording Mechanism, of which the following is a full, clear, concise, and exact description, reference being had to the accompanying drawings, forming a part of this specification.

This invention relates to improvements in recording mechanism.

As is well known, one common form of testing draft gears for railway cars is by means of a heavy drop hammer, generally weighing 9,000 lbs., which is elevated to different heights and dropped on to the gears. While, from this method can be determined the blow which a gear will absorb before going solid or before which it will fail to release, nothing can be determined as to the rate of work performed by the gear in resisting the blow, without some exterior recording mechanism. As will be appreciated by those skilled in the art, it is very desirable to know the performance of a gear, that is the rate at which it does work and the rate of doing work at different times in its stroke, in addition to knowing the total blow which it will absorb.

The object of my invention is to provide simple means which may be attached to the usual drop hammer now employed in testing draft gears or other shock absorbing mechanism and from which can be obtained a card or record showing the work performed by the gear.

Another and more specific object of the invention is to provide a recording attachment of the type above indicated which is dependent for its operation upon the law of inertia.

The invention furthermore consists in the improvements in the parts and devices and in the novel combinations of the parts and devices herein shown, described or claimed.

In the drawing forming a part of this specification, Figure 1 is an elevational view of a drop hammer such as used in testing railway draft gears, and showing my improvements in connection therewith. Fig. 2 is an elevation, upon an enlarged scale, of the recording attachment which is shown in Fig. 1 as applied to the weight. Fig. 3 is an enlarged sectional view taken substantially on the line 3—3 of Fig. 1. Fig. 4 is a view similar to Fig. 2, but illustrating another embodiment of the invention. Fig. 5 is a view similar to Fig. 3, but illustrating the structure shown more particularly in Fig. 4. Fig. 6 is a detail sectional view taken substantially on the line 6—6 of Fig. 4. Fig. 7 is a vertical, sectional view taken substantially on the line 7—7 of Fig. 6. Fig. 8 is a detail perspective of one of the elements employed in the structure employed in Figs. 4, 5, 6 and 7. Fig. 9 is a diagrammatic view illustrating a sample record made with the device shown in Figs. 1, 2 and 3. And Fig. 10 is a view corresponding to Fig. 9, but illustrating the type of record made by the structures shown in Figs. 4 to 8 inclusive.

Referring first to the structure illustrated in Figs. 1, 2 and 3, 20 denotes an anvil on which is placed the gear 21 to be tested. On top of the gear 21 is usually placed a follower 22 by which the blow is transmitted from the vertically movable 9,000 lb. weight 23. The latter is guided in its vertical movements by suitable heavy side guides 24—24. The weight 23 is lifted by means of a magnet 25 carried by a cross head 26 which is also guided by the guide members 24. The cross head 26 is elevated by means of the cable 27 which runs over suitable pulleys to a motor (not shown). When the weight or hammer 23 has been lifted the required distance through the cross head 26 and magnet 25, the current in the electro magnet is shut off, thereby releasing the weight or hammer and permitting it to fall.

The improved recording attachment shown in Figs. 1, 2 and 3, comprises a member A, arm B and record sheet C. The member A is preferably of spring steel and comprises a circular or disk-like member 28 at one end centrally perforated and seated on a stud 29 attached to the weight 23; circular or disk-like member 30 separated a short distance from the portion 28 and connected thereto by an integral, thin neck 31. The section 28 is provided with a depending arm 32 which is held fixed in any adjusted position by means of two set screws 33—33 mounted in suitable brackets 34—34 attached to the face of the weight or hammer. Rigidly connected to the circular section 30 is the arm B, the latter preferably consisting of a thin plate of sheet metal gradually tapered toward the top and having the section so arranged that it is pratically inflexible in a plane parallel to the face of the weight 23. As will be apparent, it is adapted to yield slightly in directions perpendicularly to the face of the weight and this is done in order that it may carry a recording pencil or other marker 35 and hold the latter with a yielding pressure against the record card C. The card C is detachably held in position by means of pivotally mounted, spring controlled clips 36—36 suitably attached to the face of the weight 23.

The normal position of the parts is as shown in Figs. 1 and 2 and it will be understood that the thin neck section 31 which connects the two circular portions 28 and 30 is of such relative stiffness as to substantially rigidly support the section 30 and arm B carried thereby. When the weight 23 is elevated and then released, the momentum acquired by the following weight is very great. When the weight strikes the gear, rapid deceleration of the weight necessarily occurs. Actual tests have shown that the blows are absorbed by the gears in a few hundredths of a second. As will be apparent, the recording attachment naturally acquires the same speed as the weight or hammer 23 during the fall of the latter. As the hammer is rapidly decelerated in the manner above described, it is apparent that the circular portion 30 of the member A will attempt to continue its fall, but due to the fact that the circular portion 28 is held rigid with the weight or hammer 23, the portion 30 will continue its movement and in advance of the weight 23 a certain distance, depending upon its inertia or acquired momentum and the resistance afforded by the spring section 31. The amount which the section 31 is flexed will depend upon the blow transmitted to the gear and the rate at which that blow is absorbed or, in other words, the rate of deceleration of the weight or hammer 23. As the member 30 shifts its position relatively to the weight or hammer, the arm B will swing toward the right, as viewed in Figs. 1 and 2, thus causing the marker or pencil 35 to travel over the card C. Referring to Fig. 9, it will be seen that a diagram will be made such as indicated at 37, the line 38 indicating normal or zero and from which the diagram 37 starts. There will only be one line 37, that is to say, the pencil or marker 35 will travel from zero up to the apex 39 of the record and back again over the same path. Knowing the weight of the falling body or hammer 23, the weights of the different parts of the recording mechanism, and the force necessary to flex the section 31 different amounts, which variations of flexure, of course, correspond to different distances from the zero line 38 on the record card C, the total blow and also the rate of deceleration or work performed at any instant can be ascertained. The attachment is simple, comprises few parts, is durable and well adapted to withstand the severe usage to which it is subjected. It will also be understood that the adjusting screws 33 are provided to properly locate the zero point of the marker on the card C and to insure the normal horizontal position of the member A.

Referring now to the construction shown in Figs. 4, 5, 6, 7 and 8, the recording attachment comprises a plate D adapted to be attached to the weight or hammer; a member $A^1$ corresponding to the member A of the other arrangement; a pivotally mounted lever arm $B^1$ which carries the recording pencil and corresponds to the arm B of the first described structure; and a constant surface speed rotating recording drum $C^1$, the latter being operated from a motor E.

The plate D is secured to the hammer 23 by a number of bolts or other suitable devices 40. On its outer face, the plate D is provided with a stud 41 on which is mounted the perforated circular section 128 of the member $A^1$, said portion 128 having a depending arm 132 which is fixedly held in adjusted position by set screws 133 mounted in suitable brackets 134. The member $A^1$ is provided with a solid circular section 130 connected to the section 128 by a thin spring neck 131. At its outer side, the circular portion 130 is provided with two forked extensions 42—42, each of which, on its under face is provided with a blunt tapered recess 43 as clearly indicated in Fig. 7 and with which is adapted to coöperate knife edges 44—44 on a pendulum member P. The latter is provided with a downwardly arranged knife edge 45 intermediate the knife edges 44, which pivots upon a hardened insert 46 mounted in a suitable bracket 47 carried by the plate D. The knife edges 44 and 45 are offset as clearly indicated at Fig. 7 so that, upon pressure being applied to the knife edges 44, the latter will be moved downwardly and the member P will swing in a counter clockwise direction about the knife edge 45. This will cause the arm $B^1$, which is rigidly attached to the member P as indicated at 48, to swing to the left as viewed in Fig. 4. The pencil or marker 135 carried by the arm $B^1$ will then traverse the sheet wound on the recording drum C¹. In order to prevent movements occurring merely through the momentum acquired, the member P is held under spring tension by means of a pivotally attached rod 49 which slides within perforated ears 50. Mounted on the rod 49 is a spring 51, the tension of which is adjusted by means of a thumb screw 52. To properly locate the pencil 135 in zero position at all times, the member P is provided with a depending arm 53 which engages a set screw 54 threaded in a flange formed on the plate D. The drum C¹ is or may be directly connected with the armature of the motor E, the latter being supplied with electrical energy by suitable wiring which is not deemed necessary to describe.

In operation, the member A¹ will be flexed or bent the same as the member A, thus causing the arm B¹ to be swung as heretofore described. The cylinder being rotated at constant speed, a diagram will be made such as indicated at 55 in Fig. 10, in which figure the line 56 represents the zero line. Knowing the surface speed of the record cylinder C¹ which can be maintained constant, and the characteristics of the member A¹ and arm B¹, the same as described for corresponding members A and B, the amount of work and rate of work at any instant can be calculated from the diagram made. The construction shown in Figs. 1, 2 and 3 records merely the operation of the gear during the impact. The construction illustrated in the other figures from which the diagram shown in Fig. 10 is obtained, gives a complete record of the work of the gear during both impact and release.

Although I have herein shown and described what I now consider the preferred means of carrying out my invention, the same are merely illustrative and I contemplate all changes and modifications that come within the scope of the claims appended hereto.

I claim:

1. In mechanism of the character described, the combination with a heavy movable body, of a relatively light member secured to said body, adapted to be brought to rest substantially instantaneously; one part of said member being free to move relatively to the other parts thereof substantially instantaneously under the action of inertia, and means including a rapidly moving recording sheet, for indicating the amount of such relative movement due to such inertia.

2. The combination with a drop hammer, of an attachment for recording the deceleration of said hammer, said attachment comprising a member having one portion thereof adapted to be rigidly secured to the hammer, and another portion free to move relatively to the first named portion under the influence of inertia while the hammer is being decelerated, and means for indicating the amount of said movement.

3. The combination with a drop hammer, of a recording attachment including, a member having one end rigidly attached to the hammer with the other end free to move relatively thereto under a sufficient degree of inertia, a record strip, a marker for said strip and means interposed between said free end and said marker for actuating the latter in accordance with the amount of movement of said free end relatively to the hammer.

4. The combination with a drop hammer, of a recording attachment including, a member having one end rigidly attached to the hammer with the other end free to move relatively thereto under a sufficient degree of inertia, a record strip, a marker for said strip, and means interposed between said free end and said marker for actuating the latter in accordance with the amount of movement of said free end relatively to the hammer, and means for adjusting the zero position of the attachment.

5. In mechanism adapted to be attached to a drop hammer, the combination with a member having two circular enlargements connected by a thin, flexible section, one of said circular enlargements being centrally perforated and provided with a radial arm, whereby it is adapted to be seated over a stud and prevented from movement thereon by the engagement of said arm with fixed members, of a marker controlling arm operated by the other of said circular enlargements in accordance with the amount of relative movement between the two circular portions.

6. In a recording mechanism of the character described, the combination with a member having one end thereof adapted to be fixedly attached to a drop hammer or the like and having the other end thereof freely supported but flexibly united thereto, of a pivotally mounted arm, a marker carried by said arm, a recording drum with which said marker coöperates, spring means for preventing overthrow of said arm, said arm being actuated by the free end of said member when the latter is moved relatively to the hammer or other element under the influence of inertia.

7. In a recording mechanism of the character described, the combination with a heavy movably mounted body of a predetermined weight, of a relatively light member secured to said body, said member having one portion thereof rigidly attached to said body, said member having another portion connected to the first named portion by an integral relatively rigid yet flexible section, said section flexing under severe shocks only, the amount of flexure being dependent upon the shocks and of previously ascertained values, and means including a recording sheet and a stylus associated with said member for registering the degree of flexure of said member under a heavy shock due to sudden changes in the rate of movement of said body.

In witness that I claim the foregoing I have hereunto subscribed my name this 15th day of July 1916.

JOHN F. O'CONNOR.

Witnesses:
ELIZABETH M. BRITT,
LUCILLE HIGGINS.

Copies of this patent may be obtained for five cents each, by addressing the "Commissioner of Patents, Washington, D. C."